United States Patent [19]

Rezgui et al.

[11] Patent Number: 5,309,136
[45] Date of Patent: May 3, 1994

[54] ELECTRICAL CIRCUIT SUCH AS A WHEATSTONE BRIDGE WITH A RESISTANCE-ADJUSTING PORTION

[75] Inventors: Fadhel Rezgui, Paris, France; Luc M. Petitjean, Danbury, Conn.

[73] Assignee: Schlumberger Technology Corporation, Houston, Tex.

[21] Appl. No.: 918,188

[22] Filed: Jul. 23, 1992

[30] Foreign Application Priority Data

Jul. 26, 1991 [FR] France ................ 91 09479

[51] Int. Cl.⁵ .................. H01C 7/22; G01L 1/22
[52] U.S. Cl. ...................... 338/295; 338/2; 338/3; 338/5; 73/862.474
[58] Field of Search .............. 338/295, 2-5; 73/862.622, 727, 765, 862.629, 862.474

[56] References Cited

U.S. PATENT DOCUMENTS

| | | | |
|---|---|---|---|
| 4,462,018 | 7/1984 | Yang et al. | 338/3 |
| 4,633,721 | 1/1987 | Nishiyama | 73/862.67 |
| 4,748,858 | 6/1988 | Ort | 73/862.63 |
| 4,945,762 | 8/1990 | Adamic, Jr. | 73/862.67 |

FOREIGN PATENT DOCUMENTS

| | | |
|---|---|---|
| 0339191 | 11/1989 | European Pat. Off. . |
| 0373010 | 6/1990 | European Pat. Off. . |
| 3528510 | 3/1986 | Fed. Rep. of Germany . |
| 2063560 | 6/1981 | United Kingdom . |

Primary Examiner—Marvin M. Lateef
Attorney, Agent, or Firm—Henry N. Garrana; John H. Bouchard

[57] ABSTRACT

An electrical circuit such as a Wheatstone bridge has a conductive strip extending between a current input terminal and a current output terminal and includes two resistors having a connecting part therebetween, a conductive segment extending between the connecting part and a measuring terminal, the connecting part being formed as a wider portion of the conductive strip in the direction of the conductive segment, the conductive segment having an adjusting portion between the connecting part and the measuring terminal.

10 Claims, 1 Drawing Sheet

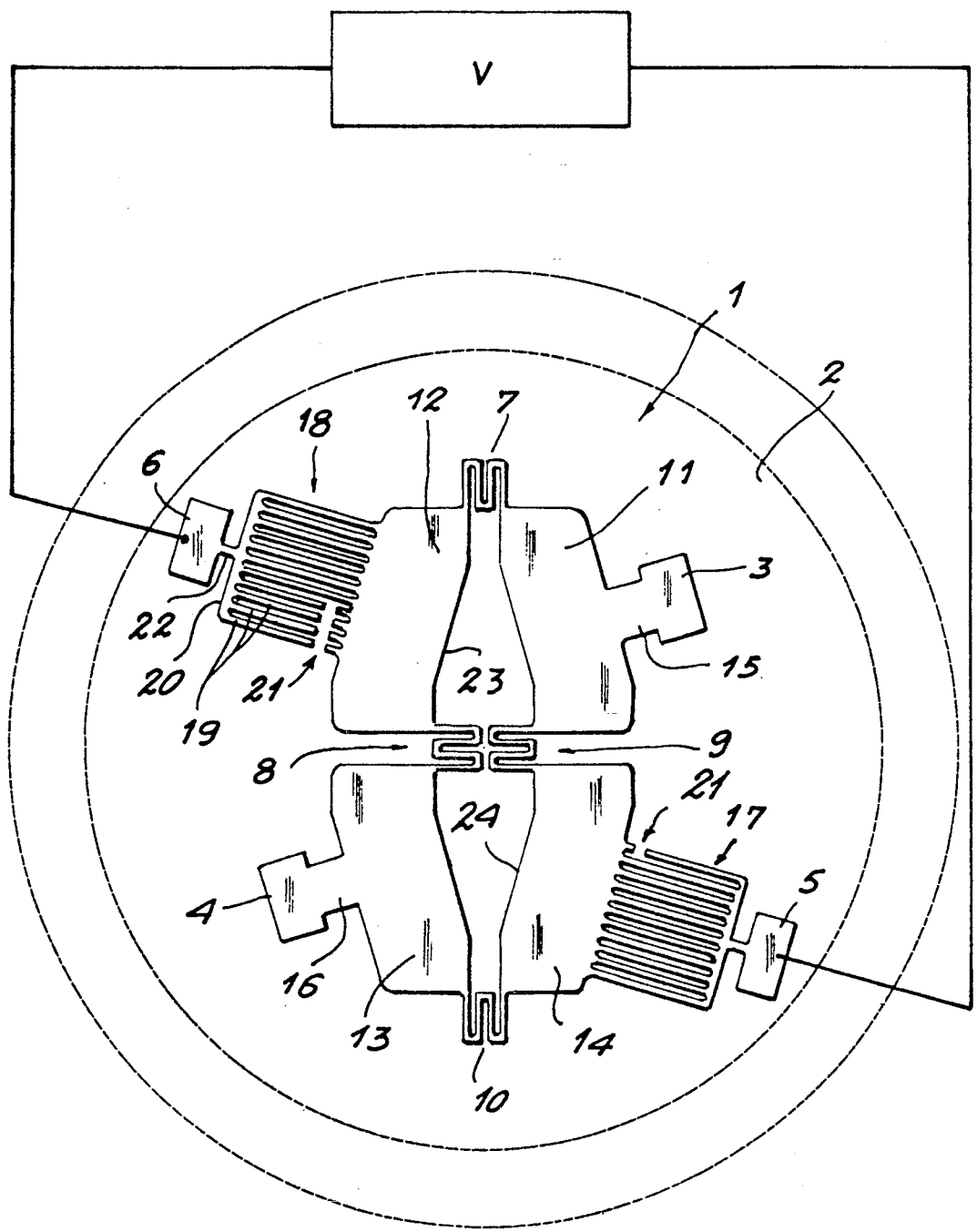

ELECTRICAL CIRCUIT SUCH AS A WHEATSTONE BRIDGE WITH A RESISTANCE-ADJUSTING PORTION

BACKGROUND OF THE INVENTION

1. Field of the Invention

This invention relates to an electrical circuit such as a Wheatstone bridge with at least one resistance-adjusting portion.

2. Description of Related Art

Such circuits are widely used to measure the deformation of mechanical parts through the variation in the resistances of the resistors which they include and which are deformed at the same time as the part on which they are bonded or deposited. An important advantage of a Wheatstone bridge is its high stability over long periods and with respect to changes in temperature. It is however necessary to adjust the resistances to balance the bridge, i.e. to obtain a null signal between the measuring terminals when no load is applied. This is why bridges are provided with additional resistors which can be adjusted to balance the bridge and possibly its thermal sensitivity. Several methods have already been developed to effect these adjustments.

In U.S. Pat. No. 4,945,762, current-limiting resistors and adjusting resistors are placed in series. During normal operation of the circuit current flows simultaneously through the adjusting resistors and the current-limiting resistors. When an adjustment is to be made, current is caused to flow in a reverse direction in a pulsed mode so as to bypass the bridge resistors and current-limiting resistors and flow through branches formed by diodes which are conducting in this one direction only. The current passes through the adjusting resistors only, which resistors are then subject to such an intensity of current that migration of constituent atoms occurs towards the surrounding substrate, which modifies their resistance.

In other proposals, adjusting resistors connected in parallel are added or removed. A disadvantage is that the carrying out of such operations entails physical/chemical non-uniformities in the conductive material which forms the bridge or circuit, for example by oxidation. The different materials or alloys usually have characteristics which change differently with time and which also behave differently in response to variations in temperature, as the thermal behavior is also a characteristic of the material. Measurement quality is compromised by these various sources of inaccuracy.

SUMMARY OF THE INVENTION

The object of the invention is thus to allow an electrical circuit such as a Wheatstone bridge to be adjusted without affecting its measurement characteristics and the stability of such characteristics with time.

There is provided according to the invention an electrical circuit comprising a conductive strip extending between a current input terminal and a current output terminal and comprising two resistors having a connecting part therebetween, a conductive segment extending between the connecting part and a measuring terminal, said connecting part being formed as a wider portion of the conductive strip in the direction of the segment, said segment having an adjusting portion between the connecting part and the measuring terminal.

The adjusting portion may be either continuous or formed by identical, uniformly spaced parallel strips. In the latter case the adjustment is normally facilitated because it is easy to program a laser so that its beam cuts a predetermined number of the strips, which amounts to a well defined fraction of the width of the segment.

The circuit is advantageously constituted by a layer of uniform thickness and constant composition.

The circuit may be a Wheatstone bridge; it is then formed from two circuits in accordance with the foregoing description, with their input and output terminals respectively connected together.

An embodiment of the invention is described below in more detail, with reference to the drawing.

BRIEF DESCRIPTION OF THE DRAWING

FIG. 1 is a schematic of the invention.

DETAILED DESCRIPTION OF THE INVENTION

There is shown in FIG. 1 a Wheatstone bridge 1 formed from a uniform electrically conductive layer, of uniform thickness, deposited on a substrate 2, then etched to the appropriate shape to form a continuous strip. The substrate 2 may be the inside surface of a sapphire capsule of a pressure transducer, as described in U.S. Pat. No. 5,024,098, it being understood that this is only an example and the applicability of the present invention is not limited to this particular example.

The Wheatstone bridge 1 comprises a current input terminal 3, a current output terminal 4, a positive measuring terminal 5, a negative measuring terminal 6, four resistors 7 to 10 formed by serpentine constrictions in the strip forming the circuit, four wider strip portions 11 to 14 each interconnecting two of the resistors 7 to 10, two connecting segments 15 and 16 connecting the wider strip portions 11 and 13 respectively to the current input terminal 3 and to the current output terminal 4, and two adjusting segments 17 and 18 connecting the wider strip portions 14 and 12 respectively to the positive measuring terminal 5 and to the negative measuring terminal 6. Each of the adjusting segments 17 and 18 is formed by an array of fine parallel strips 19, arranged like a comb between the strip portion 12 or 14 and a transverse conductor 20 connected to the measuring terminal 5 or 6 by a connecting area 22. The parallel strips 19 are identical and separated by constant gaps. The balance of the bridge can be adjusted by cutting one or more of the parallel strips 19 by a laser, along cutting lines 21, thus increasing the overall resistance of each of the adjusting segments 17 and 18.

The parts of the cut parallel strips 19 which end in the wider strip portions 12 or 14, while they form dead arms in the sense that they cannot carry current to the measuring terminals 5 and 6 or in the opposite direction, nevertheless have an effect on the overall behavior of the bridge. Cutting provokes local modification in the composition of the conductive material, especially by oxidation. A residual part of the current may continue to flow along the cut strips, with the parts modified by cutting affecting the long-term stability of the bridge. The effect would seem to be slight and would be tolerable in most situations, but it is undesirable in transducers providing highly accurate measurements over several weeks and operating in environments subject to large variations in temperature, such as oil wells.

The wider strip portions 12 and 14 between the resistors 7 and 8, and between the resistors 9 and 10, widen preferentially towards the adjusting segments 17 and 18, and exclusively so in the embodiment shown, so that the current which flows between the resistors 7 to 10 is concentrated in the regions adjoining the inner edges 23 and 24 of the strip portions 12 and 14, which regions form the shortest routes. Since the voltmeter V connected between the measuring terminals 5 and 6 has a very large impedance compared with the total resistance of the circuit, the current paths are hardly deviated and a very small fraction reaches the adjusting segments. The effect of changes in composition will thus be absolutely negligible in this situation and excellent stability of the Wheatstone bridge 1 over time is to be expected.

We claim:

1. An electrical circuit comprising a conductive strip extending between a current input terminal and a current output terminal said conductive strip including two resistors having a connecting part therebetween, a conductive segment extending between said connecting part and a measuring terminal, said connecting part being formed as a wider portion of said conductive segment in the direction of said measuring terminal, said conductive segment having an adjusting portion between connecting part and said measuring terminal.

2. An electrical circuit according to claim 1, wherein said adjusting portion is of uniform width and is formed by identical, uniformly spaced parallel strips.

3. An electrical circuit according to claim 1, constituted by a layer having uniform thickness and uniform composition.

4. An electrical circuit according to claim 2, constituted by a layer having uniform thickness and uniform composition.

5. A Wheatstone bridge formed by two circuits according to claim 1, with their respective current input terminals and current output terminals being connected together.

6. A Wheatstone bridge formed by two circuits according to claim 2, with their respective current input terminals and current output terminals being connected together.

7. A Wheatstone bridge formed by two circuits according to claim 3, with their respective current input terminals and current output terminals being connected together.

8. A Wheatstone bridge formed by two circuits according to claim 4, with their respective current input terminals and current output terminals being connected together.

9. An electric circuit formed by a conductive strip extending between a current input terminal and a current output terminal and comprising:

two resistors having a connecting part therebetween, said connecting part including a first region providing the shortest route for current flow between said resistors, in which the current density is comparatively high, and a second region spaced apart from said first region in a transverse direction relative to the current flow between said resistors, in which the current density is comparatively low; and a conductive segment, connected to said second region, for connecting said circuit to a measuring terminal, said segment including an adjusting portion.

10. A Wheatstone bridge formed by a conductive strip extending between a current input terminal and a current output terminal and comprising:

two pairs of resistors, each pair having a connecting part between them and wherein each connecting part includes an inner edge region providing the shortest route for current flow between the resistors, in which the current density is comparatively high, and an outer region spaced apart from said inner edge region in a transverse direction relative to the current flow between said resistors, in which the current density is comparatively low; and a pair of conductive segments for connection to respective measuring terminals, said conductive segments being respectively connected to said outer regions of said connecting parts, each of said segments including an adjusting portion.

* * * * *